(12) United States Patent
Yoshizawa

(10) Patent No.: US 8,298,045 B2
(45) Date of Patent: Oct. 30, 2012

(54) METHOD OF REMEDYING GLASS SUBSTRATE DEFECT

(75) Inventor: Takenori Yoshizawa, Tsu (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/042,271

(22) Filed: Mar. 7, 2011

(65) Prior Publication Data

US 2011/0159227 A1 Jun. 30, 2011

Related U.S. Application Data

(62) Division of application No. 12/298,280, filed as application No. PCT/JP2007/054899 on Mar. 13, 2007, now Pat. No. 8,079,893.

(30) Foreign Application Priority Data

Aug. 3, 2006 (JP) ................................. 2006-212607

(51) Int. Cl.
*B24B 1/00* (2006.01)

(52) U.S. Cl. .............................................. 451/41; 65/28

(58) Field of Classification Search ........ 65/28; 451/41, 451/42, 57, 58
See application file for complete search history.

(56) References Cited

U.S. PATENT DOCUMENTS

| 5,071,054 A | 12/1991 | Dzugan et al. |
| 5,707,272 A | 1/1998 | Hashimoto et al. |
| 7,492,081 B2 * | 2/2009 | Hori et al. ...................... 313/112 |
| 7,713,361 B2 | 5/2010 | Ochiai et al. |
| 2010/0080648 A1 | 4/2010 | Ochiai et al. |

FOREIGN PATENT DOCUMENTS

| JP | 5-210074 A | 8/1993 |
| JP | 6-313871 A | 11/1994 |
| JP | 2000-294141 A | 10/2000 |
| JP | 2002-131510 A | 5/2002 |
| JP | 2005-189360 A | 7/2005 |

OTHER PUBLICATIONS

U.S. Office Action dated Feb. 7, 2011, for U.S. Appl. No. 12/298,280.
Office Action in U.S. Appl. No. 12/298,280 mailed May 11, 2011.
U.S. Notice of Allowance issued in U.S. Appl. No. 12/298,280 on Oct. 11, 2011.

* cited by examiner

*Primary Examiner* — Timothy V Eley
(74) *Attorney, Agent, or Firm* — Birch, Stewart, Kolasch & Birch, LLP

(57) ABSTRACT

A technology for remedying a defect in a glass substrate which constitutes a display panel. There is provided a method of remedying a defect in a glass substrate which constitutes a display panel, which method includes performing grinding of glass material, until reaching internal bubble (1*b*) from surface (1*s*) of glass substrate (1), with respect to a region where the internal bubble (1*b*) occurring within the glass substrate (1) is positioned and further also grinding off a glass material position surrounding the internal bubble (1*b*).

3 Claims, 12 Drawing Sheets

METHOD OF REMEDYING GLASS SUBSTRATE DEFECT

This application is a Divisional Application of application Ser. No. 12/298,280, filed on Oct. 23, 2008 now U.S. Pat. No. 8,079,893. Application Ser. No. 12/298,280 is the National Phase of PCT International No. PCT/JP2007/054899 filed on Mar. 13, 2007, and claimed priority under 35 U.S.C. §119(a) to Patent Application No. 2006-212607 filed in Japan on Aug. 3, 2006, all of which are hereby expressly incorporated by reference into the present application.

BACKGROUND OF THE INVENTION

1. Field of the Invention

The present invention relates to remedying a defect in a glass substrate which constitutes a display panel.

2. Description of the Related Art

There have been many cases that a glass substrate is used as a substrate for constituting a flat display panel such as a liquid crystal panel or a plasma display panel (PDP). Requirements for the glass substrate for a flat display (hereinafter simply referred to as "glass substrate") have been more and more difficult as enlargement of display has been accelerated in recent years.

One of the requirements for the glass substrate is a reduction in glass substrate defect. Here, the glass substrate defect indicates an internal defect such as an internal bubble or an internal foreign matter, and a surface defect such as a protrusion or a scratch formed on a surface of a glass substrate.

When a flat display is formed with the use of a glass substrate having a defect, it causes a display defect such as a bright dot or a black dot in the vicinity of the defect. On this account, it is preferable that a glass substrate include as little defects as possible.

Here, the following explanation deals with how such the glass substrate defect occurs.

In a process of melting a glass material in producing a glass substrate, air comes into the material or a gas is emitted from a fire-resisting material, thereby causing a bubble in the melted glass material. As such, an internal bubble is caused. Further, there are some glass materials to be used that generate a gas themselves. Such internal bubbles exist at a certain ratio depending on a volume, and it is not easy to decrease the ratio. In a case where a bubble existing inside a glass substrate is located close to a surface of the glass substrate, the glass substrate may include a protrusion (including a projection or an undulation) on the surface thereof.

Meanwhile, an internal foreign matter is caused due to (i) a raw material, or (ii) contamination from outside. As the internal foreign matter caused due to a raw material, there are (a) a case where a glass material is not melted and remains as a foreign matter, and (b) a case where a material that is not easily melted is mixed in a glass material. Further, as the contamination from outside, there is a case where a fire-resisting material that has been used for melting a glass material is mixed in the glass material and remains as a foreign matter. In a case where such a foreign matter existing inside the glass substrate is located close to a surface of the substrate, the glass substrate may include a protrusion (including a projection or an undulation) on the surface of the glass substrate, similarly to the internal bubble.

A protrusion formed on the surface of the glass substrate is, as has been already described, a surface defect that is caused due to an internal bubble or internal foreign matter.

Further, a scratch formed on the surface of the glass substrate is caused such that, in a processing step of carrying out an edge process with respect to glass substrates cut out from a large glass plate, which is called a primitive plate, the glass substrates come into contact with each other.

Here, though this is not the one for dealing with the glass substrate defects, there has been known a technique for eliminating a bright dot defect, in which technique a recess is formed on a region corresponding to a defective pixel in a glass substrate, and a light-shielding resin is filled into the recess, so that leakage of light is prevented (see Patent Documents 1 and 2).

Further, there has been also known a polishing apparatus for removing a very small protrusion by grinding the protrusion formed in a color filter of a liquid crystal display panel (see, for example, Patent Document 3).

Moreover, there has been a method for remedying a defect, such as a pin hole and a void, of a dielectric film provided on a full plate of a plasma display apparatus (see, for example, Patent Document 4).

However, as described above, any of the techniques disclosed in Patent Documents 1 through 4 are not techniques for dealing with the glass substrate defects.

[Patent Document 1]

Japanese Unexamined Patent Publication, Tokukaihei, No. 5-210074 (published on Aug. 20, 1993)

[Patent Document 2]

Japanese Unexamined Patent Publication, Tokukai, No. 2005-189360 (published on Jul. 14, 2005)

[Patent Document 3]

Japanese Unexamined Patent Publication, Tokukaihei, No. 6-313871 (published on Nov. 8, 1994)

[Patent Document 4]

Japanese Unexamined Patent Publication, Tokukai, No. 2000-294141 (published on Oct. 20, 2000)

DISCLOSURE OF INVENTION

Such the glass substrate defect can cause a display defect in a flat display.

For example, in a case where an internal bubble having a certain degree of size (for example, a diameter is not less than 100 μm) exists in a glass substrate, a region in the vicinity of the bubble is observed as a bright dot. Although a mechanism of how a bright dot occurs due to such an internal bubble is not necessarily clear, it is considered that, because the internal bubble exists, a lens effect is caused due to a glass around the internal bubble, or a scattered polarization state is caused due to a residual stress of the glass around the internal bubble, thereby causing such the bright dot.

Further in a case where an internal foreign matter having a certain degree of size exists in a glass substrate, similarly to the case of the internal bubble, since the internal foreign matter exists, a lens effect is caused due to a glass around the internal bubble, or a scattered polarization state is caused due to a residual stress of the glass around the internal foreign matter. This causes a region in the vicinity of the internal foreign matter to be observed as a bright dot. Moreover, in a case where the internal foreign matter is made of a light-shielding material, a black dot may occur.

Furthermore, in a case of a surface defect such as a protrusion or a scratch, a minute refracting surface or reflecting surface is formed in a direction different from that of a surface of a glass substrate. As a result, a bright dot due to them can occur.

In this respect, from the viewpoint of a display quality, it is ideal to use a glass substrate having no defect. However, it is impossible to produce such a glass substrate. Further, even if the occurrence of defects can be reduced to a certain degree by improving a production process of a glass substrate, there is a limit.

On the other hand, in a case where it is assumed that all glass substrates including defects that may cause a display defect are regarded as defective products, problems such as a reduction in production yield and an increase in cost of a glass substrate and a flat display may arise. Especially in a large glass substrate for a large display, the reduction in production yield is a serious problem because the large glass substrate is stochastically likely to include such the defect.

From these reasons, a technique in which, even if a produced glass substrate includes a defect, the defect is remedied so that a good-quality product is produced by use of the glass substrate, is required.

Such the technique is required for both glass substrates that constitute a liquid crystal display panel and a plasma display panel. From the following reason, the technique is more significantly required for the glass substrate for a liquid crystal display panel.

In the glass substrate for a liquid crystal display panel, it is necessary to provide a semiconductor element on its surface, and the semiconductor element easily receives a bad influence from an alkali metal. From this reason, it is general to use, for the glass substrate for a liquid crystal display panel, a non-alkali glass that does not include the alkali metal as an additive component (the alkali metal as an impurity is not more than 1%). However, since a melting point of the non-alkali glass is high, in a case where the non-alkali glass is used, while a glass material is melted, a bubble does not easily come out from the material, thereby resulting in that the bubble tends to remain inside as an internal bubble. As such, the glass substrate for a liquid crystal display panel tends to include a defect as the internal bubble. In view of this, the technique for producing a good-quality product especially by remedying such a defect is particularly highly required for the glass substrate for a liquid crystal display panel.

The present invention is accomplished in view of the above problems. An object of the present invention is to provide a technique for remedying a defect in a glass substrate which constitutes a display panel.

A defect remedying method of the present invention is for remedying a defect in a glass substrate which constitutes a display panel, and the method includes carrying out a removal process with respect to a region where an internal defect is formed in the glass substrate, in which removal process a glass material is removed from a surface of the glass substrate to the internal defect.

As has been already describe, when a display panel is constituted by use of a glass substrate that includes an internal defect such as an internal bubble or an internal foreign matter, a region in the vicinity of the internal defect is observed as a bright dot due to a lens effect that is caused by a glass around the internal defect, a scattered polarization state that is caused by a residual stress in the glass around the internal defect, or the like.

In contrast, in the method, the removal process is carried out with respect to a region where the internal defect is formed in the glass substrate, and removes a glass material from a surface of the glass substrate to the internal defect. Thereby, at least a part (a part on a surface side) of the glass around the internal defect that causes the lens effect or the scattered polarization state is removed. As a result, the lens effect or the scattered polarization state is reduced, with the result that the region where the internal defect is formed can be hardly observed.

As such, the method makes it possible to remedy an internal defect in a glass substrate so that a display defect due to the internal defect in the glass substrate is reduced.

In the defect remedying method of the present invention, it is preferable that, in the removal process, a glass material by which the internal defect is surrounded is also removed.

In the method, the glass material from the surface of the glass substrate to the internal defect and further the glass material by which the internal defect is surrounded, i.e., the glass material placed on a lateral side and a backside of the internal defect are removed, thereby further reducing the lens effect or the scattered polarization state.

In the defect remedying method of the present invention, it is preferable that a tangent plane, at any certain position on a surface of a recess formed in the removal process, be parallel or inclined with respect to the surface of the glass substrate.

In the method, the tangent plane at any position on the surface of the recess formed in the removal process is not vertical to the surface of the glass substrate. As a result, a surface of the recess can be hardly observed.

In the defect remedying method of the present invention, it is preferable that a transparent material be filled into the recess formed in the removal process.

In the method, the transparent material (solid) is filled into the recess formed in the removal process. This makes it possible to reduce a change in refractive index in the recess, compared with a state where the recess is not filled. As a result, the recess can be hardly observed.

In the defect remedying method, the internal defect may be an internal bubble.

Further, in the defect remedying method, the glass substrate may constitute a liquid crystal display panel.

Since a glass substrate which constitutes a liquid crystal display panel contains less alkali metal and its melting point is high, an internal bubble easily occurs. In this regard, the method particularly has an effect on the glass substrate which constitutes a liquid crystal display panel.

A defect remedying method of the present invention is for remedying a defect in a glass substrate which constitutes a display panel, and the method includes carrying out a removal process with respect to a region where a protrusion, serving as a surface defect, is formed on the glass substrate, in which removal process a glass material is removed from a surface of the glass substrate so that the protrusion is planarized.

Further, a defect remedying method of the present invention is for remedying a defect in a glass substrate which constitutes a display panel, and the method includes carrying out a removal process with respect to a region where a scratch, serving as a surface defect, is formed on the glass substrate, in which removal process a glass material is removed so that a surface formed by the scratch is smoothed.

As has been already described, when a display panel is constituted by use of a glass substrate that includes a surface defect such as a protrusion or a scratch, a minute refracting surface or reflecting surface is formed in a direction different from that of the primary surface of the glass substrate. This can cause a bright dot.

In contrast, in the method, the protrusion is planarized or the scratch is smoothed. Here, planarizing a protrusion means that a part or all of the protrusion is removed so that a height of the protrusion is lowered. In planarizing the protrusion, a slight recess may be formed in a region where the part or all of the protrusion is removed. Further, smoothing a surface formed by a scratch means reducing an angle between the surface formed by the scratch and the primary surface of the glass substrate.

This allows a surface on which a protrusion or a scratch is formed, to almost have a primary surface shape, thereby resulting in that a bright dot due to the protrusion or the scratch can hardly occur.

As such, the method makes it possible to remedy a surface defect on a glass substrate so that a display defect due to the surface defect on the glass substrate is reduced.

In the defect remedying method of the present invention, it is preferable that the removal process be grinding with the use of a grinding stone or a grinding tape.

In the method, when the grinding stone or the grinding tape is used, its state of having a contact with a surface of the glass substrate is a surface contact. In this regard, in comparison of a point contact, even in a case where a protrusion is formed on the surface, the surface contact restrains the tool from slipping, thereby realizing appropriate processing.

Note that each of the defect remedying methods can be also considered as a method of producing a glass substrate.

That is to say, a method of the present invention of producing a glass substrate is for producing a glass substrate which constitutes a display panel, and the method includes carrying out a removal process with respect to a region where an internal defect is formed in the glass substrate, in which removal process a glass material is removed from a surface of the glass substrate to the internal defect.

In the removal process, it is preferable that the glass material by which the internal defect is surrounded be also removed.

Moreover, a method of the present invention of producing a glass substrate is for producing a glass substrate which constitutes a display panel, and the method includes carrying out a removal process with respect to a region where a protrusion, serving as a surface defect, is formed on the glass substrate, in which removal process a glass material is removed from a surface of the glass substrate so that the protrusion is planarized.

Further, a method of the present invention of producing a glass substrate is for producing a glass substrate which constitutes a display panel, and the method includes carrying out a removal process with respect to a region where a scratch, serving as a surface defect, is formed on the glass substrate, in which removal process a glass material is removed so that a surface formed by the scratch is smoothed.

A glass substrate of the present invention for a display panel is a glass substrate which constitutes a display panel. In a surface of a display area of the display panel, which display area is obtained when the display panel is constituted by the glass substrate, the glass substrate includes a region (i) to which a removal process in which a glass material is removed is carried out and (ii) in which a transparency is maintained.

In the arrangement, in the display area of the display panel, which display area is obtained when the display panel is constituted by the glass substrate, the glass substrate includes, in the surface, a region (i) to which a removal process in which a glass material is removed is carried out and (ii) in which a transparency is maintained. With the arrangement, it is possible to replace an internal defect or a surface defect to the region where a transparency is maintained. This can reduce a display defect due to the internal defect or surface defect of the glass substrate.

In the glass substrate of the present invention for a display panel, a recess may be formed in a region where the removal process has been carried out. Further, a transparent material may be filled into the recess. This allows the recess to be hardly observed.

Further, when a display panel is constituted by use of the glass substrate for a display panel, it is possible to reduce, in the display panel, a display defect due to an internal defect or a surface defect of the glass substrate.

As described above, the defect remedying method of the present invention is for carrying out a removal process with respect to a region where an internal defect is formed in the glass substrate, in which removal process a glass material is removed from a surface of the glass substrate to the internal defect.

Moreover, the defect remedying method of the present invention is for carrying out a removal process with respect to a region where a protrusion, serving as a surface defect, is formed on the glass substrate, in which removal process a glass material is removed from a surface of the glass substrate so that the protrusion is planarized.

Furthermore, the defect remedying method of the present invention is for carrying out a removal process with respect to a region where a scratch, serving as a surface defect, is formed on the glass substrate, in which removal process a glass material is removed so that a surface formed by the scratch is smoothed.

In each of the methods, it is possible to remedy a defect in a glass substrate, thereby resulting in that a display defect due to an internal defect or a surface defect of the glass substrate is reduced.

BRIEF DESCRIPTION OF DRAWINGS

FIG. 3($b$) is a cross sectional view illustrating a status (second stage) of the grinding process in Embodiment 1 of the present invention.

FIG. 3($c$) is a cross sectional view illustrating a status (third stage) of the grinding process in Embodiment 1 of the present invention.

FIG. 4($b$) is a cross sectional view illustrating the substantial region of the glass substrate, to which region the grinding process has been carried out until the status of FIG. 3($c$).

FIG. 5($b$) is a cross sectional view illustrating a preferable example of a surface shape processed in the grinding process.

FIG. 9($b$) is a cross sectional view illustrating a status (second stage) of the grinding process in Embodiment 2 of the present invention.

FIG. 9(c) is a cross sectional view illustrating a status (third stage) of the grinding process in Embodiment 2 of the present invention.

EXPLANATION OF REFERENTIAL NUMERALS

1. Glass Substrate
1b. Internal Bubble
1c. Internal Foreign Matter
1p. Protrusion
1s. Surface
1w. Processed Surface
2. Transparent Material
10. Defect Remedying Apparatus
11. Housing
11a. Placing Surface
12. Remedying Head
12a. Grinding Stone
20. Liquid Crystal Display Panel
20a. Display Area
21. Liquid Crystal

DETAILED DESCRIPTION OF THE INVENTION

Embodiment 1

Embodiment 1 of the present invention is described below with reference to FIGS. 1 through 7.

A defect remedying method of Embodiment 1 is for remedying a defect in a glass substrate which constitutes a display panel, and a defect to be remedied is an internal defect formed in the glass substrate.

The defect remedying method of Embodiment 1 can be applied to a glass substrate which constitutes various display panels such as a liquid crystal display panel, a plasma display panel (PDP), and the like.

Further, the defect remedying method of Embodiment 1 can be carried out in various stages in producing a glass substrate or a display panel. That is, the defect remedying method of Embodiment 1 can be carried out, for example: (i) in a stage where a glass substrate has been cut out from a primitive plate by a glass manufacturer but has not been shipped yet; (ii) in a stage where the glass substrate has been received by a manufacturer of a display device but has not been used in a display panel yet; and (iii) in a stage where a display panel constituted by use of the glass substrate has been checked but has not been assembled as a display device yet. Especially, in the case where the defect remedying method of Embodiment 1 is carried out with respect to a glass substrate that has been cut out from a primitive plate by a glass manufacturer but has not been shipped yet, the defect remedying method of Embodiment 1 is carried out as one process in a method of producing a glass substrate.

In the following explanation, it is assumed that a glass substrate is the one for a liquid crystal display panel, and the defect remedying method is carried out in the stage where a display panel constituted by use of the glass substrate has been checked but has not been assembled as a display device yet.

Note that, since a glass substrate which constitutes a liquid crystal display panel contains less alkali metal and its melting point is high, an internal bubble easily occurs. In this regard, the defect remedying method of Embodiment 1 especially has an effect on the glass substrate which constitutes a liquid crystal display panel.

Figure 1:
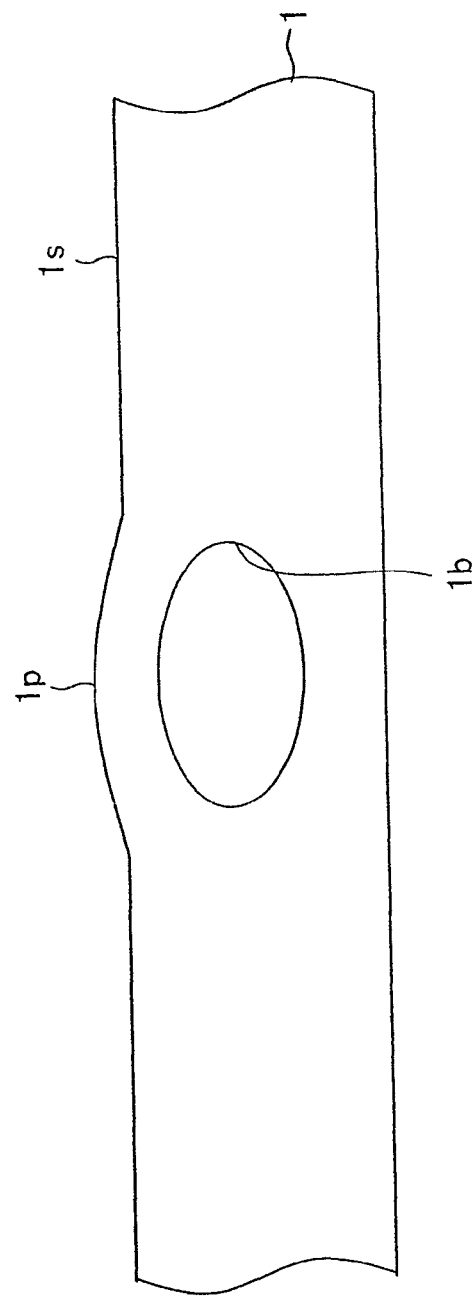
FIG. 1 is a cross sectional view illustrating a substantial region of a glass substrate as a defect to be remedied, in Embodiment 1 of the present invention.

FIG. 1 illustrates a cross section of a glass substrate 1 in which an internal bubble 1b, serving as an internal defect to be remedied, is formed. Since the internal bubble 1b of FIG. 1 has a relatively large size, and its location is relatively near from a surface is of the glass substrate 1, the glass substrate 1 includes a protrusion 1p on the surface 1s. The inner bubble 1b may not cause the protrusion 1p depending on the size and location.

The internal bubble 1b can be bubbles with various sizes such as the one whose maximum diameter is not more than 100 μm or is almost the same size as a thickness of the glass substrate 1 (for example, 0.7 mm). In a case of the internal bubble 1b being, for example, not more than 100 μm in maximum diameter, since such the small internal bubble 1b has less effect on a display, it is considered that any special processes may not be required. Further, in a case of the internal bubble 1b being, for example, 100 to 300 μm in maximum diameter, it is considered to carry out a modification process for the internal bubble 1b to be a black dot. However, in a case of the internal bubble 1b being, for example, more than 300 μm in maximum diameter, there is no conceivable effective methods for sufficiently reducing adverse effects on a display, except for the defect remedying method of Embodiment 1 as described below.

As such, the defect remedying method of Embodiment 1 can be carried out with respect to the various internal bubbles 1b from large size to small size. Among such internal bubbles 1b, the defect remedying method of Embodiment 1 especially has an effect on the large-size internal bubble 1b to which any other effective methods are hardly conceivable.

Figure 2:
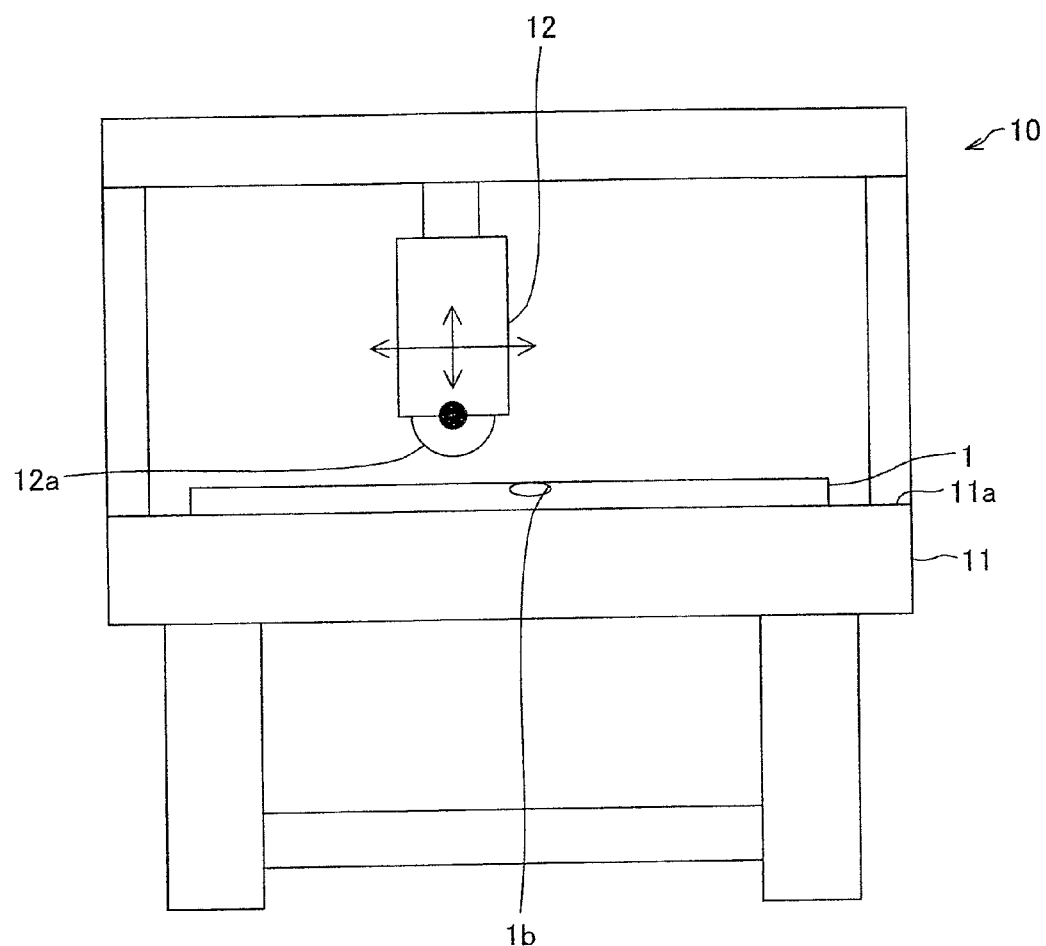
FIG. 2 is a cross sectional view illustrating an arrangement of a defect remedying apparatus used in Embodiment 1 of the present invention.
Figure 3:
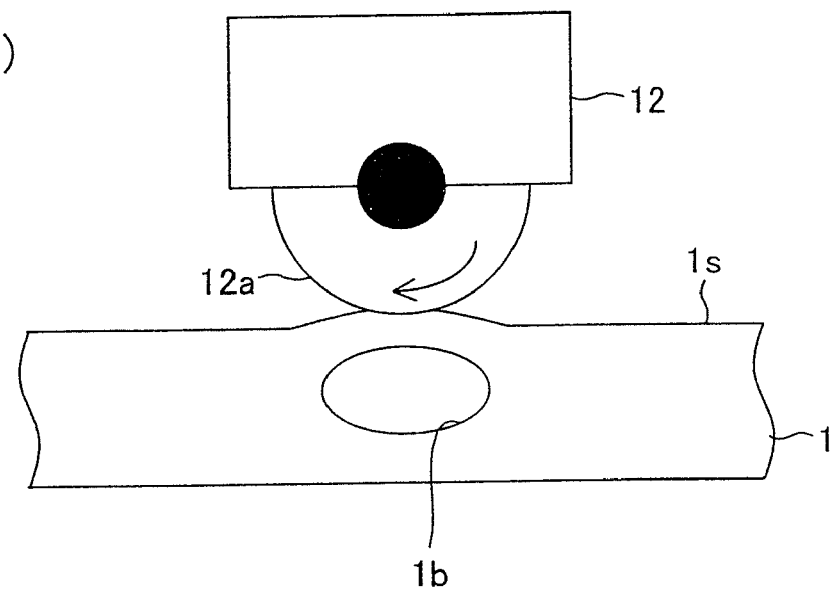
FIG. 3($a$) is a cross sectional view illustrating a status (first stage) of a grinding process in Embodiment 1 of the present invention.
Figure 3:
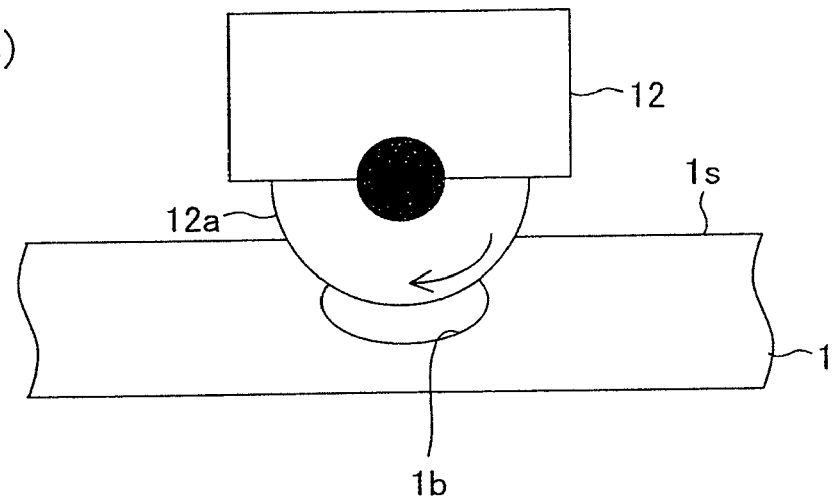
Figure 3:
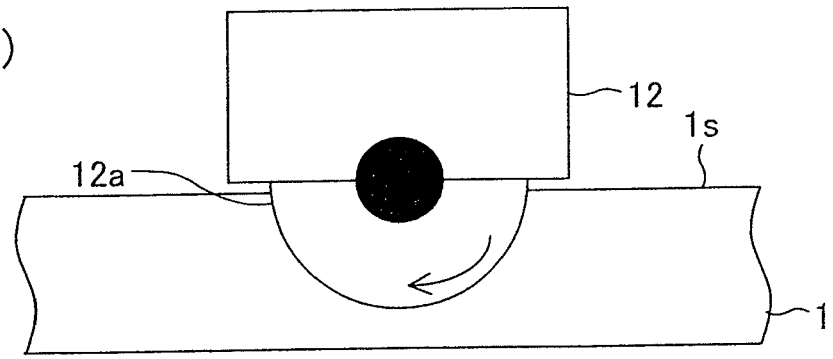
Figure 4:
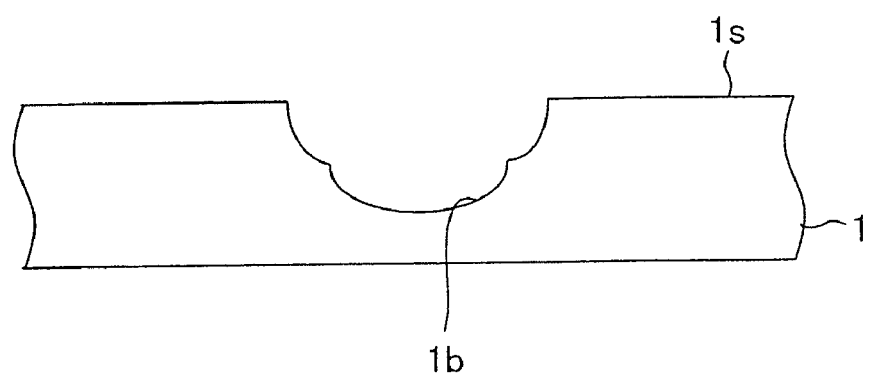
FIG. 4($a$) is a cross sectional view illustrating the substantial region of the glass substrate, to which region the grinding process has been carried out until the status of FIG. 3($b$).
Figure 4:
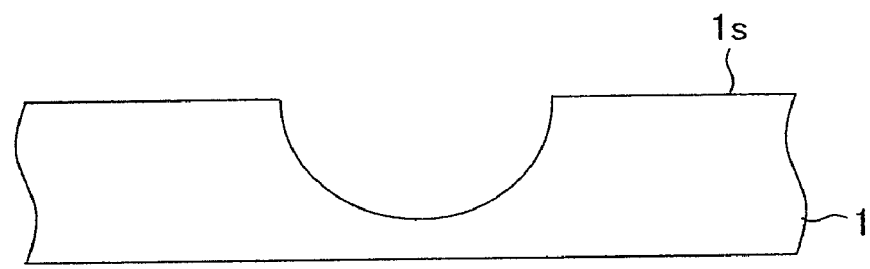

FIG. 2 is a cross sectional view illustrating a defect remedying apparatus 10 for carrying out the defect remedying method of Embodiment 1. The defect remedying apparatus 10 includes: a housing 11 including a placing surface 11a on which a glass substrate is to be placed; and a remedying head 12 that is suspended from a ceiling of the housing 11 and is movable in horizontal and vertical directions.

Further, the remedying head 12 includes a grinding stone 12a for grinding the glass substrate 1. The grinding stone 12a has a round-shaped cross section and rotates by a rotating mechanism of the remedying head 12.

The defect remedying apparatus 10 carries out a grinding process such that the apparatus 10 causes (i) the remedying head 12 to move to above the internal bubble 1b of the glass substrate 1, and (ii) the grinding stone 12a to rotate at the position while the remedying head 12 steadily comes down, so that the grinding stone 12a comes into contact with a surface 1s of the glass substrate 1.

The defect remedying method of Embodiment 1 can be carried out, for example, in the following procedures. Firstly, a liquid crystal display panel is formed by use of a glass substrate 1 in which a defect has not been remedied yet. While the liquid crystal display panel is evenly irradiated by light from its backside, it is checked whether or not a bright dot due to an internal bubble 1b formed in the glass substrate can be observed. In a case where the bright dot is observed, a location thereof is specified. Then, the liquid crystal display panel is placed on the placing surface 11a of the defect remedying apparatus 10, and the after-mentioned grinding process is carried out at the specified location. In a case where a polarization plate is attached on a surface of the glass substrate, the polarization plate may be detached once before the grinding process is carried out, and attached to the glass substrate 1 again after the grinding process is completed.

FIGS. 3(a) through (c) illustrate statuses of the grinding process. When the remedying head 12 comes down, as illustrated in FIG. 3(a), an outer peripheral surface of the rotating grinding stone 12a comes into contact with the surface is of the glass substrate 1, thereby causing the grinding process. When the remedying head 12 further comes down, as illustrated in FIG. 3(b), the outer peripheral surface of the grinding stone 12a reaches the internal bubble 1b, so that a glass material is removed from the surface is to the internal bubble 1b. When the remedying head 12 further comes down, as illustrated in FIG. 3(c), the outer peripheral surface of the grinding stone 12a reaches a lateral side and a backside of the internal bubble 1b, thereby removing a glass material by which the internal bubble 1b is surrounded.

In the defect remedy method of Embodiment 1, the removal process may be carried out until the status of FIG. 3(b), or until the status of FIG. 3(c). Each of FIGS. 4(a) and (b) illustrates a state of the glass substrate 1 to which the removal process has been carried out until each of the statuses in FIGS. 3(b) and (c).

Each state illustrated in FIG. 4(a) or (b) is not necessarily an ideal state from the viewpoint of a shape of the glass substrate 1. However, as a result of checking an actual effect on a display, it was more difficult to observe a bright dot due to the internal bubble 1b, compared with a state of the glass substrate 1 to which the removal process has not been carried out yet.

As a reason for this, a particular mechanism is not necessarily certain, but can be considered as follows.

When a liquid crystal display panel is constituted by use of the glass substrate 1 including the internal bubble 1b, a lens effect due to a glass around the internal bubble 1b or a scattered polarization state due to a residual stress of the glass around the internal bubble 1b causes a region in the vicinity of the internal bubble 1b to be observed as a bright dot.

In contrast, as illustrated in FIG. 4(a), when the removal process is carried out so that the glass material is removed from the surface 1s to the internal bubble 1b, at least a part (a part on the surface side) of the glass around the internal bubble 1b, which causes the lens effect or the scattered polarization state, is removed. As a result, the lens effect or the scattered polarization state is reduced, thereby resulting in that it is difficult to observe the region in the vicinity of the internal bubble 1b as a bright dot.

Further, as illustrated in FIG. 4(b), when the glass material on the lateral side or the backside of the internal bubble 1b is removed, it is considered that the lens effect or the scattered polarization state can be further reduced.

Next, explained is a preferable processed shape. As illustrated in FIG. 5(a), in a case where a recess having a steep shape in which a part of a processed surface 1w is vertical to the surface 1s is formed, in an observation direction D vertical to the surface 1s, the vertical part of the processed surface 1w is identical with the observation direction D. In this case, effects of the processed surface 1w on a display are accumulated in the observation direction D. As a result, this causes the processed surface 1w to be easily observed.

In contrast, in FIG. 5(b), unlike the above one with a steep shape, the processed surface 1w is not vertical to the surface 1s, and a tangent plane, at any position on the processed surface 1w (illustrated by a dashed-dotted line in FIG. 5(b)), is parallel or inclined with respect to the surface 1s. In this case, effects of the processed surface 1w on a display are not accumulated in the observation direction D. As a result, this allows the processed surface w1 to be hardly observed.

As such, it is preferable that the processed shape be such that the tangent plane, at any position in the processed surface 1w, is parallel or inclined with respect to the surface 1s, as illustrated in FIG. 5(b). In order that such the processed shape is formed, a grinding stone 12a having a large diameter to some extent may be used, or a grinding stone 12a may be swayed in a horizontal direction during processing.

Figure 6:
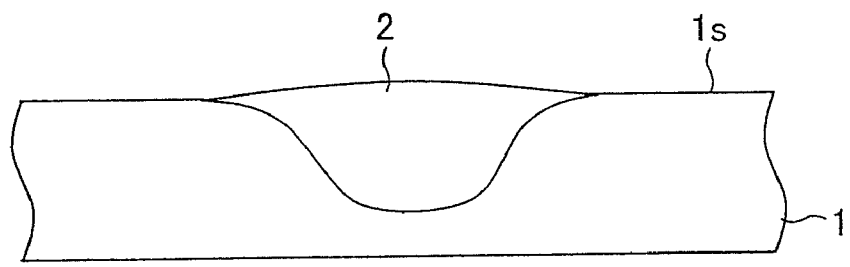
FIG. 6 is a cross sectional view illustrating a state in which a transparent material is filled into a recess formed in the grinding process.

Further, it is preferable that a transparent material 2 be filled into the recess formed in the removal process, as illustrated in FIG. 6. When the transparent material is filled into the recess, it is possible to reduce a change in refractive index, compared with a state where the recess is not filled. This allows the recess to be hardly observed. In order that the transparent material 2 is filled into the recess formed in the removal process as such, a liquid transparent resin may be filled into the recess and then solidified.

Such the transparent material is preferably a transparent acrylic casting resin or a transparent epoxy casting resin. As the transparent epoxy casing resin, the one in which modified aliphatic polyamine or modified alicyclic polyamine as a curing agent is added to an epoxy resin as a main component is especially preferable because a high degree of transparency comparable to an acrylic resin can be obtained. The materials exemplified here are just examples, and various well-known materials can be used as the transparent material 2 other than the examples.

In the defect remedying apparatus 10, the grinding stone 12a is used as a tool, but instead of the grinding stone 12, a grinding tape may be also used. When the grinding stone 12a or the grinding tape is used, its state of having a contact with the surface 1s of the glass substrate 1 is surface contact. In this regard, in comparison with point contact, even in a case where a protrusion 1p is formed on the surface 1s, the surface contact restrains the tool from slipping, thereby realizing appropriate processing.

Further, the processing is a grinding process with the use of the grinding stone 12a. Since the processing in the defect remedying method of Embodiment 1 is aimed at removing partially the glass substrate 1, the removal process is not limited to the grinding process, and other removal processes that can attain the above object are applicable to the defect remedying method of Embodiment 1.

The removal process that can attain the object may be for example, a UV laser process, which can make an around 20 μm hole. Further, an ultrasonic rotary process can be also used, which can make an around 500 μm hole. The concrete processing methods exemplified here are exemplary processing methods applicable to the defect remedying method of Embodiment 1, and various well-known processing methods are applicable to the defect remedying method of Embodiment 1 other than the exemplary methods.

Figure 7:
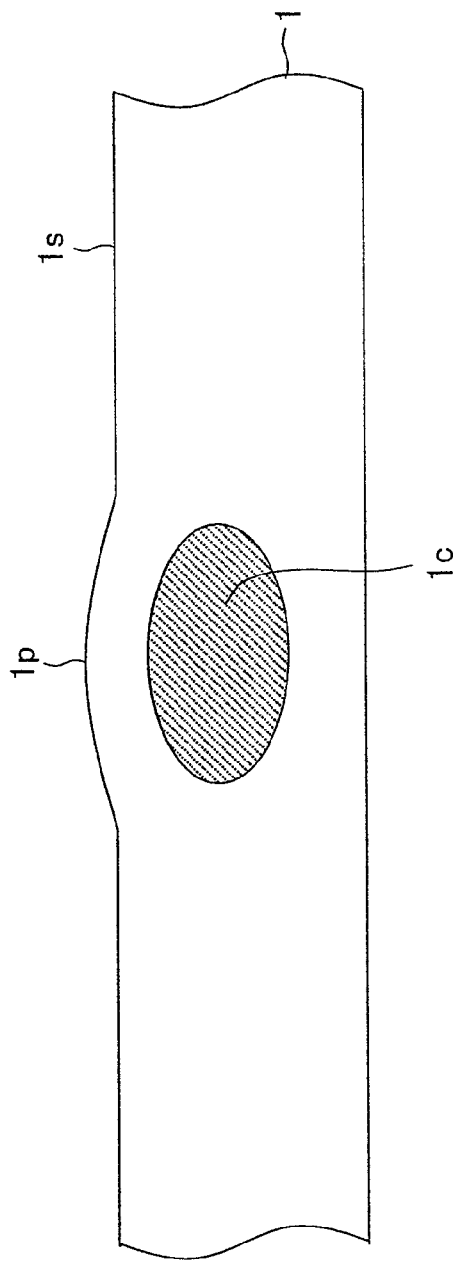
FIG. 7 is a cross sectional view illustrating a substantial region of another glass substrate as a defect to be remedied, in Embodiment 1 of the present invention.

In the above description, the glass substrate 1 that includes the internal bubble 1b as an internal defect is an object to be remedied, but also, a glass substrate 1 that includes an internal foreign matter 1c as an internal defect, as illustrated in FIG. 7, may be an object to be remedied. Even in this case, it is possible to realize a reduction in the lens effect or the scattered polarization state. Further, in a case where the internal foreign matter 1c is made from a light-shielding material, if the internal foreign matter 1c is fully removed, as illustrated in FIG. 4(b), then it is possible to obtain an effect that a black dot is removed.

Embodiment 2

Embodiment 2 of the present invention is explained below with reference to FIGS. 8 and 9.

A defect remedying method of Embodiment 2 is for remedying a defect in a glass substrate which constitutes a display panel, and a defect to be remedied is a protrusion as a surface defect formed on the glass substrate. The protrusion may be formed due to an internal defect, as explained in Embodiment 1, and may be also formed independently of such an internal defect.

Further, similarly to Embodiment 1, the defect remedying method of Embodiment 2 can be applied to a glass substrate which constitutes various display panels such as a liquid crystal display panel, a plasma display panel (PDP), and the like.

Moreover, similarly to Embodiment 1, the defect remedying method of Embodiment 2 can be carried out in various stages in producing a glass substrate or a display panel.

Figure 8:
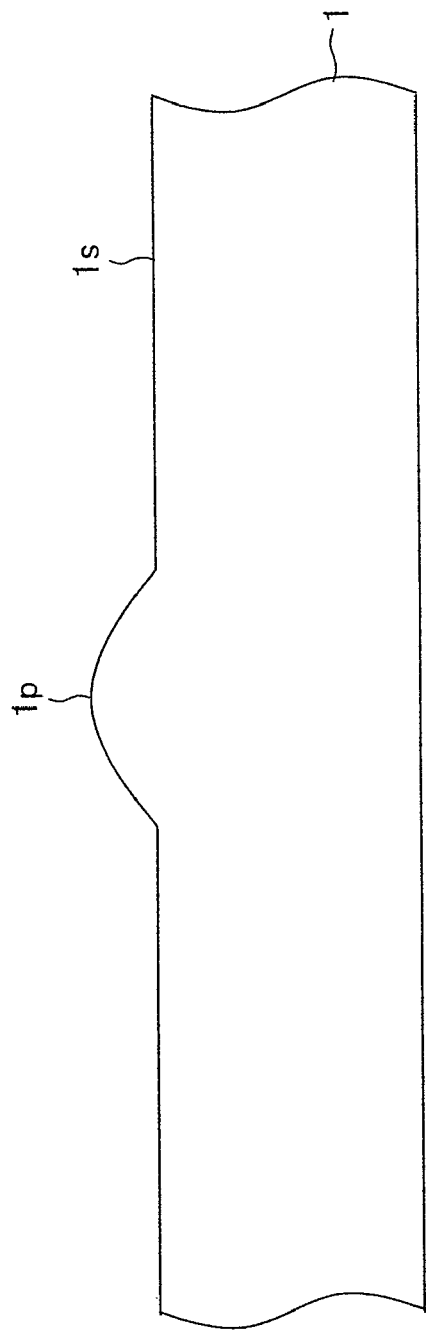
FIG. 8 is a cross sectional view illustrating a substantial region of a glass substrate as a defect to be remedied, in Embodiment 2 of the present invention.

FIG. 8 illustrates a cross section of a glass substrate 1 on which a protrusion 1*p*, serving as a surface defect to be remedied, is formed. As an apparatus for carrying out the defect remedying method of Embodiment 2, the defect remedying apparatus 10 explained in Embodiment 1 can be used.

Figure 9:
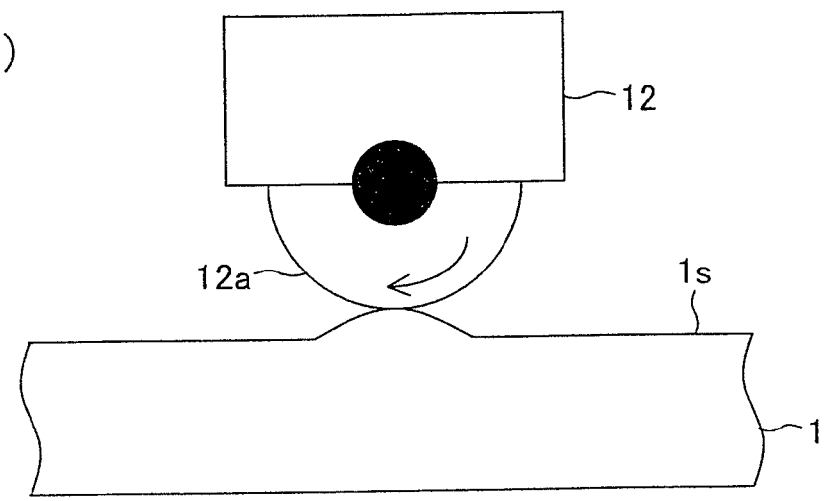
FIG. 9($a$) is a cross sectional view illustrating a status (first stage) of a grinding process in Embodiment 2 of the present invention.
Figure 9:
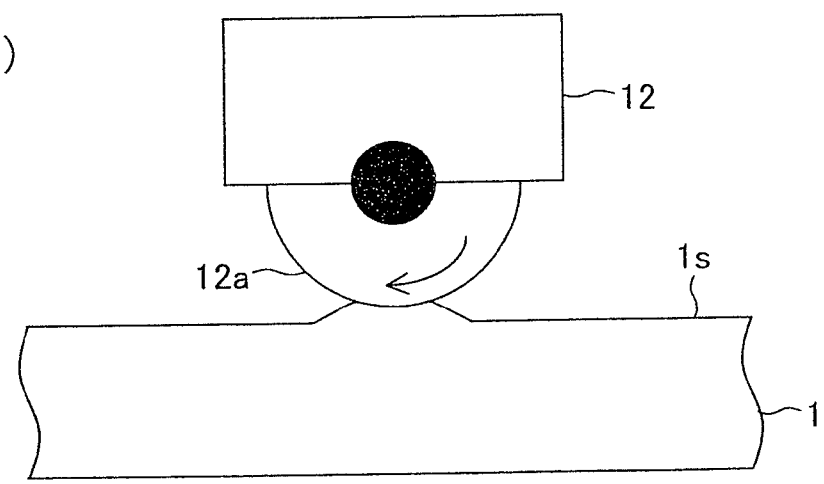
Figure 9:
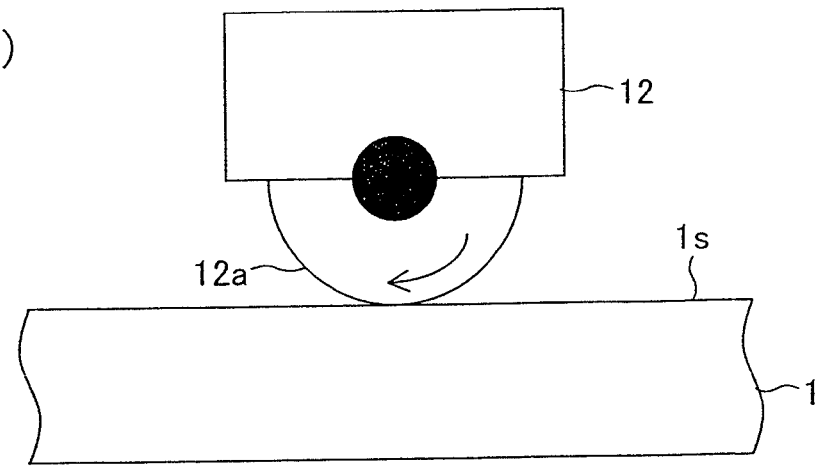

FIGS. 9(*a*) through (*c*) illustrate statuses of a grinding process. When a remedying head 12 comes down, as illustrated in FIG. 9(*a*), an outer peripheral surface of the rotating grinding stone 12*a* comes into contact with the protrusion 1*p* of the glass substrate 1, thereby causing the grinding process. When the remedying head 12 further comes down, as illustrated in FIG. 9(*b*), a height of the protrusion 1*p* becomes lowered. When the remedying head 12 further comes down, as illustrated in FIG. 9(*c*), the protrusion 1*p* is fully removed. If the grinding stone 12*a* having a sufficiently large curvature radius is used, or the remedying head 12 is swayed in a horizontal direction while the remedying head 12 comes down, then it is possible to make the surface 1*s*, from which the protrusion 1*p* is removed, substantially planar.

In the defect remedy method of Embodiment 2, the removal process may be carried out until the status of FIG. 9(*b*), or until the status of FIG. 9(*c*). As such, in the defect remedying method of Embodiment 2, a part or all of the protrusion 1*p* is removed so that a height of the protrusion 1*p* is lowered. This is referred to as planarization of the protrusion 1*p*. This allows a shape of the surface 1*s* on which the protrusion 1*p* is formed, to almost have a primary surface shape. As a result, this makes it possible that a bright dot due to the protrusion 1*p* hardly occurs.

Figure 5:
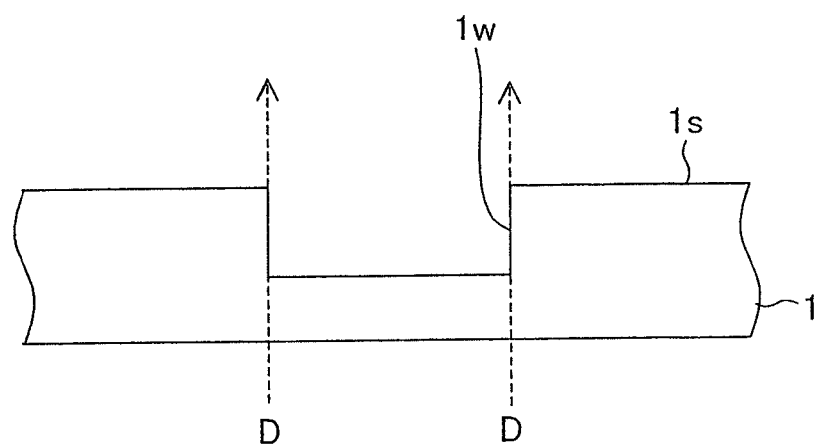
FIG. 5($a$) is a cross sectional view illustrating an example of a surface shape processed in the grinding process.
Figure 5:
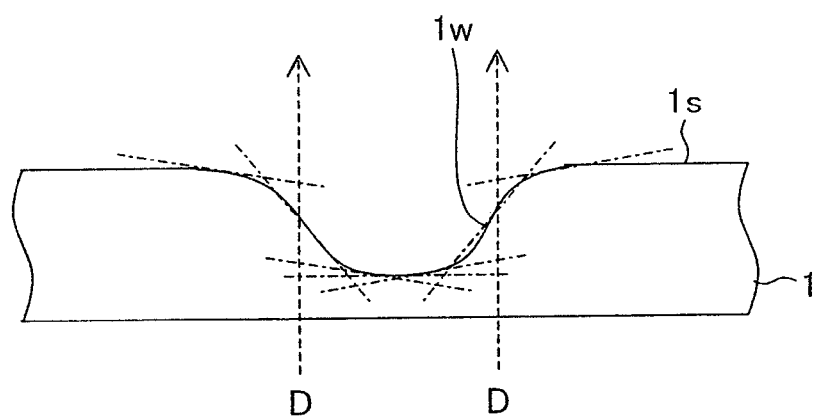

Note that, when the protrusion 1*p* is planarized, a slight recess may be formed in a part where the protrusion has been formed. In that case, as illustrated in FIG. 5(*b*) in Embodiment 1, it is preferable that a processed shape of the recess be such that a tangent plane, at any position on a processed surface 1*w*, is parallel or inclined with respect to the surface 1*s*. Further, as illustrated in FIG. 6 in Embodiment 1, it is preferable that a transparent material 2 be filled into the recess thus formed.

Furthermore, similarly to Embodiment 1, a grinding tape may be used as a tool instead of the grinding stone 12*a*, and the processing method is not limited to the grinding process and other removal process can be also used.

Embodiment 3

Embodiment 3 of the present invention is explained below with reference to FIGS. 10 and 11.

A defect remedying method of Embodiment 3 is a method of remedying a defect in a glass substrate which constitutes a display panel, and a defect to be remedied is a scratch as a surface defect formed on the glass substrate.

Further, similarly to Embodiment 1, the defect remedying method of Embodiment 3 can be applied to a glass substrate which constitutes various display panels such as a liquid crystal display panel, a plasma display panel (PDP), and the like.

Moreover, similarly to Embodiment 1, the defect remedying method of Embodiment 3 can be carried out in various stages in producing a glass substrate or a display panel.

Figure 10:
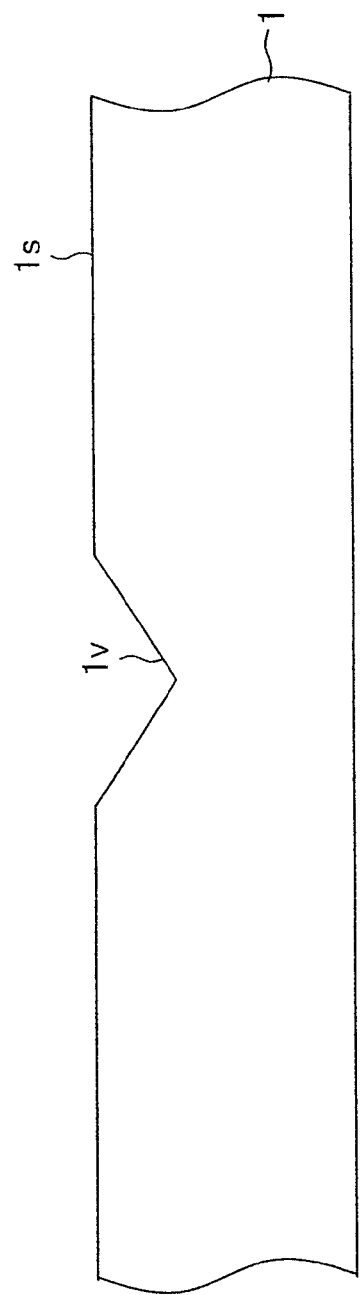
FIG. 10 is a cross sectional view illustrating a substantial region of a glass substrate as a defect to be remedied, in Embodiment 3 of the present invention.

FIG. 10 illustrates a cross section of a glass substrate 1 on which a scratch 1*v*, serving as a surface defect to be remedied, is formed. As an apparatus for carrying out the defect remedying method of Embodiment 3, the defect remedying apparatus 10 explained in Embodiment 1 can be used.

Figure 11:
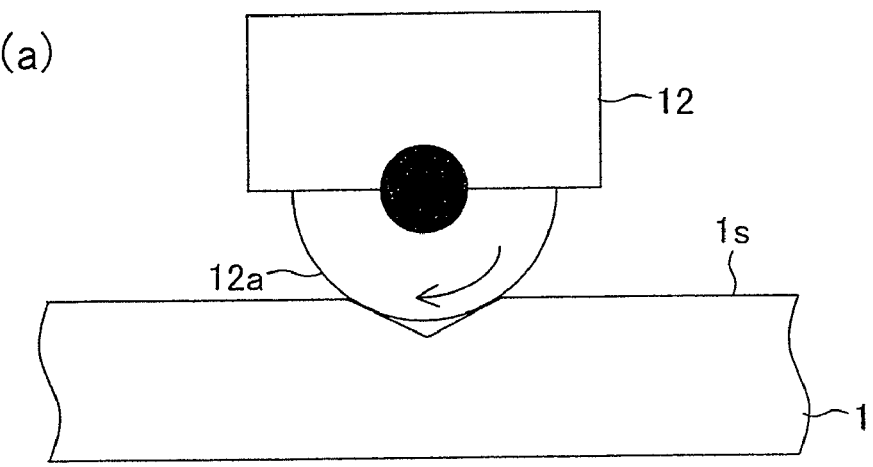
FIG. 11(a) is a cross sectional view illustrating a status (first stage) in a grinding process in Embodiment 3 of the present invention.
FIG. 11(b) is a cross sectional view illustrating a status (second stage) of the grinding process in Embodiment 3 of the present invention.
Figure 11:
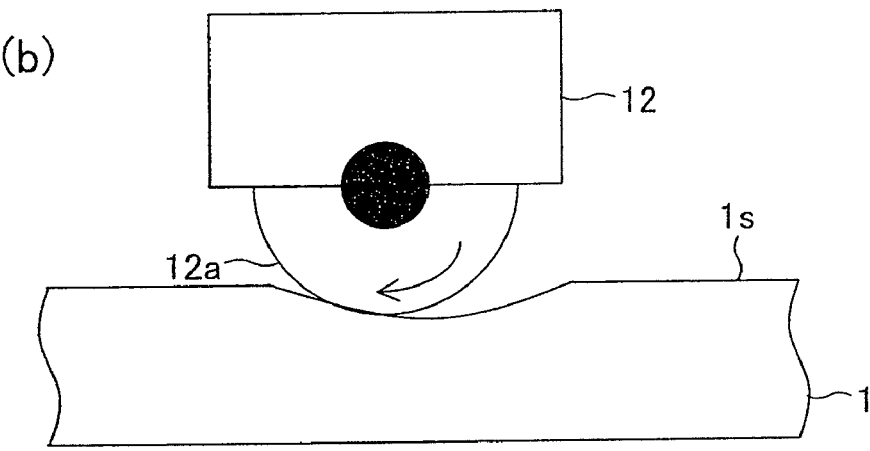

FIGS. 11(*a*) and (*b*) illustrate statuses of a grinding process. When a remedying head 12 comes down, as illustrated in FIG. 11(*a*), an outer peripheral surface of the rotating grinding stone 12*a* comes into contact with a surface is of the glass substrate 1, thereby causing the grinding process. Then, the remedying head 12 is moved up and down while the remedying head 12 is swayed, thereby resulting in that an angle formed by a surface formed by the scratch 1*v* can be reduced with respect to the primary surface 1*s* of the glass substrate 1, as illustrated in FIG. 11(*b*). Note that, if the grinding stone 12*a* having a sufficiently large curvature radius is used, then it is possible to realize the above processing without swaying the grinding stone 12*a*.

As such, in the defect remedying method of Embodiment 3, the angle formed by the surface formed by the scratch 1*v* is reduced with respect to the primary surface 1*s* of the glass substrate 1. This is referred to as smoothing of the scratch 1*v*. This allows the surface is on which the scratch 1*v* is formed, to almost have a primary surface shape. As a result, this makes it possible that a bright dot due to the scratch 1*v* hardly occurs.

Note that, it is preferable that a processed shape of a recess formed by the smoothing the scratch 1 be such that a tangent plane, at any certain position on a processed surface 1*w*, is parallel or inclined with respect to the surface 1*s*, as illustrated in FIG. 5(*b*) in Embodiment 1. Further, as illustrated in FIG. 6, it is preferable that a transparent material 2 be filled into the recess thus formed.

Furthermore, similarly to Embodiment 1, a grinding tape may be used as a tool instead of the grinding stone 12*a*, and the processing method is not limited to the grinding process and other removal process can be also used.

Figure 12:
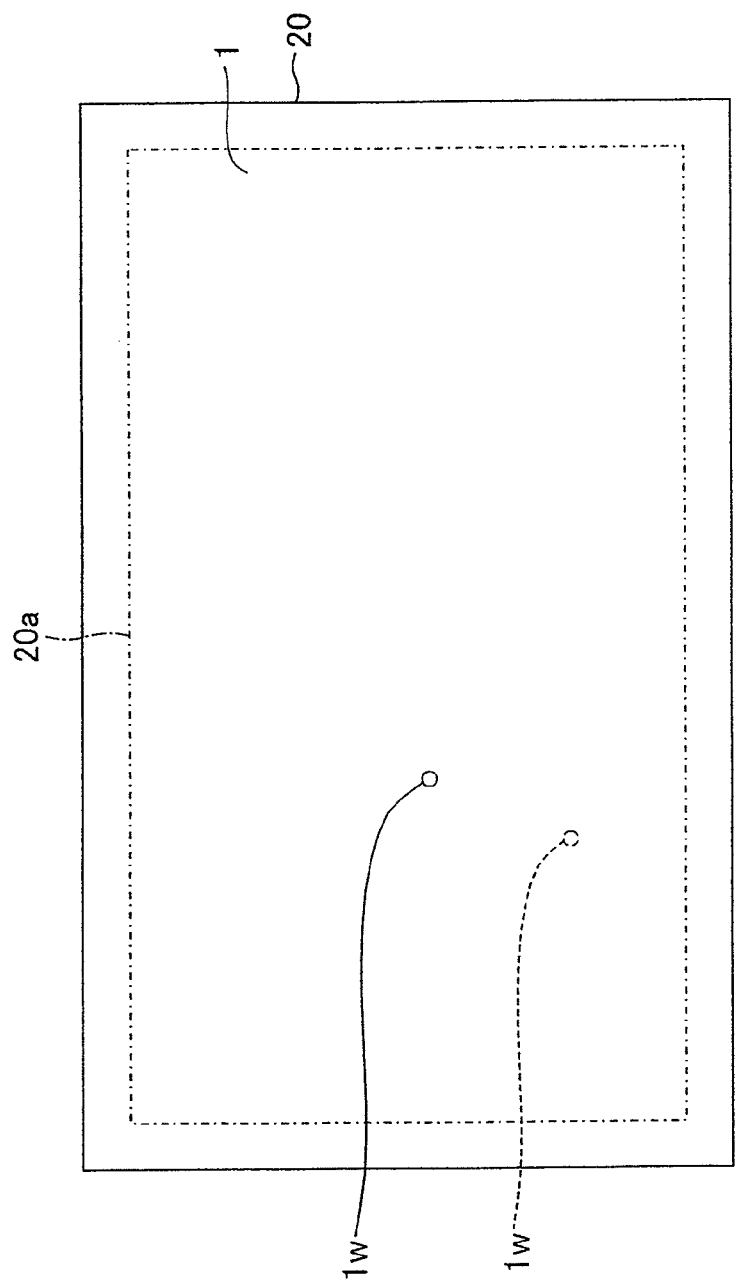
FIG. 12(a) is a plane view illustrating a liquid crystal display panel in Embodiments of the present invention.
FIG. 12(b) is a cross sectional view of the liquid crystal display panel of FIG. 12(a).
Figure 12:
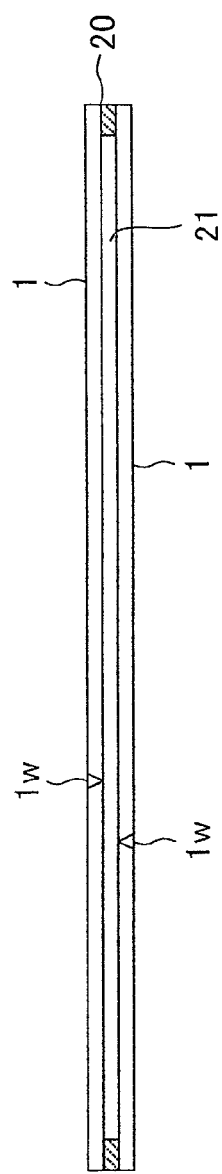

FIG. 12 illustrates a liquid crystal display panel 20 as a display panel that is constituted by use of a glass substrate 1 described in Embodiments 1 through 3.

The liquid crystal display panel 20 is provided such that (i) two glass substrates 1 and 1 are provided so as to face each other at a predetermined space provided therebetween, and (ii) a surrounding of the glass substrates 1 and 1 is sealed with a liquid crystal 21 being sandwiched therebetween. Note that a polarization plate and the like are attached to external surfaces of the glass substrates 1 and 1.

The glass substrates 1 and 1 include, on a surface in a display area 20*a* of the liquid crystal display panel 20, a processed surface 1*w* to which a removal process of Embodiments 1 through 3 in which a glass material is removed has been carried out. Note however that each of the glass substrates 1 and 1 may include the processed surface 1*w*, or either one of the glass substrates 1 and 1 may include the processed surface 1*w*. Further, it is preferable that a transparent material be filled into the processed surface 1*w*.

In the liquid crystal display panel 20, any of the removal processes of Embodiments 1 through 3 has been carried out with respect to an internal defect or a surface defect formed in the glass substrates 1 and 1, thereby resulting in that adverse affects on a display are reduced. On this account, even in a case of the liquid crystal display panel 20 that would be dealt with as a defective product in a conventional manner, the liquid crystal display panel 20 can be produced as a good-quality product.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention is preferably applicable to flat display panels such as a liquid crystal display panel and a plasma display panel (PDP).

The invention claimed is:

1. A defect remedying method for remedying a defect in a glass substrate which constitutes a display panel, said method comprising:
    placing a defect remedying apparatus directly over a protrusion, serving as a surface defect, formed on the glass substrate, such that the defect remedying apparatus makes contact only with the protrusion, and
    carrying out a removal process with respect to the protrusion, in which removal process only a glass material forming the protrusion is removed from a surface of the glass material so that the protrusion is planarized.

2. The defect remedying method as set forth in claim 1, wherein:
    the removal process is grinding with the use of a grinding stone or a grinding tape.

3. A method of producing a glass substrate which constitutes a display panel, said method comprising:
    placing a defect remedying apparatus directly over a protrusion, serving as a surface defect, formed on the glass substrate, such that the defect remedying apparatus makes contact only with the protrusion; and
    carrying out a removal process with respect to the protrusion, in which removal process only a glass material forming the protrusion is removed from a surface of the glass substrate so that the protrusion is planarized.

* * * * *